(12) United States Patent
Thusoo et al.

(10) Patent No.: US 7,016,903 B1
(45) Date of Patent: Mar. 21, 2006

(54) METHOD FOR CONDITIONALLY UPDATING OR INSERTING A ROW INTO A TABLE

(75) Inventors: Ashish Thusoo, Belmont, CA (US);
Bhaskar Ghosh, Burlingame, CA (US);
Harmeek Bedi, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 324 days.

(21) Appl. No.: 09/770,358

(22) Filed: Jan. 25, 2001

(51) Int. Cl.
*G06F 17/30* (2006.01)

(52) U.S. Cl. .......................... 707/100; 707/3; 707/203; 707/103 R; 707/103 Z

(58) Field of Classification Search .................... 707/2, 707/3, 4, 103 R, 103 Z, 203
See application file for complete search history.

(56) References Cited

U.S. PATENT DOCUMENTS

| | | | |
|---|---|---|---|
| 4,506,326 A * | 3/1985 | Shaw et al. ..................... | 707/4 |
| 5,555,388 A | 9/1996 | Shaughnessy | |
| 5,692,178 A | 11/1997 | Shaughnessy | |
| 5,706,494 A | 1/1998 | Cochrane et al. | |
| 5,864,512 A | 1/1999 | Buckelew et al. | |
| 5,956,704 A | 9/1999 | Gautam et al. | |
| 5,963,933 A * | 10/1999 | Cheng et al. ................. | 707/2 |
| 5,978,574 A | 11/1999 | Sharma | |
| 6,003,022 A * | 12/1999 | Eberhard et al. .............. | 707/2 |
| 6,009,432 A * | 12/1999 | Tarin ........................... | 707/10 |
| 6,223,182 B1 | 4/2001 | Agarwal et al. | |
| 6,356,901 B1 | 3/2002 | MacLeod et al. | |
| 6,411,951 B1 * | 6/2002 | Galindo-Legaria et al. .... | 707/3 |
| 6,418,437 B1 | 7/2002 | Cole | |
| 6,453,314 B1 | 9/2002 | Chan et al. | |
| 6,567,823 B1 * | 5/2003 | Rothschild ............... | 707/104.1 |
| 6,581,205 B1 * | 6/2003 | Cochrane et al. ............. | 707/3 |
| 6,636,846 B1 | 10/2003 | Leung et al. | |
| 6,654,756 B1 | 11/2003 | Quernemoen et al. | |
| 6,687,798 B1 | 2/2004 | Thusoo et al. | |
| 6,735,587 B1 * | 5/2004 | Colby et al. .................... | 707/4 |
| 6,768,986 B1 | 7/2004 | Cras et al. | |
| 2004/0199519 A1 | 10/2004 | Gu et al. | |

OTHER PUBLICATIONS

Ravi Kanth et al. Improved concurrency control techniques for multi-dimensional index structure, Parallel Processing Symposium, Apr. 3, 1998, pp. 580-586.*
Amer-Yahia et al. A declarative approach to optimize bulk loading into databases, ACM Transactions on Database System. pp. 233-281, 2004.*
Oracle Corporation, "Oracle9;Database Daily Feature, MERGE Statement," published Sep. 17, 2002, 3 pages.
Shirinne Alison, et al., Oracle Corporation, "Oracle9i Warehouse Builder, User's Guide," Release 9.0.3, Mar. 29, 2002, Part No. A97306-01, 35 pages.

* cited by examiner

*Primary Examiner*—Jean M. Corrielus
*Assistant Examiner*—Baoquoc N. To
(74) *Attorney, Agent, or Firm*—Bingham McCutchen LLP

(57) ABSTRACT

The present invention provides the ability to alternatively update or insert a row into a table. This functionality is accomplished by merging a source table with a destination table such that the rows in the combined table are classified as an update row or an insert row. An identifier is inserted into each row to indicate its class. Examination of the identifier allows the row to be correctly inserted into the destination table or correctly updated in the destination table.

36 Claims, 7 Drawing Sheets

METHOD FOR CONDITIONALLY UPDATING OR INSERTING A ROW INTO A TABLE

BACKGROUND OF THE INVENTION

1. Field of the Invention

The present invention generally relates to the field of database queries and standard query languages, and more specifically relates to conditionally updating or inserting a row from a source table into a destination table.

2. Related Art

In today's computer oriented environment, database use and management are paramount to efficient operations. Data warehouses provide a significant advantage to organizations that seek to optimize access to information stored in databases. Often, transaction data from one or more online transaction processing ("OLTP") system are collected and centrally stored in a data warehouse. Typically, the data in the data warehouse is refreshed with the transaction data from the OLTP system on a periodic basis.

Data to be merged into a data warehouse often may fall within two defined types. A first type consists of incoming transaction data corresponding to data that already exists in the data warehouse. This type of data may be used to update the existing data in the data warehouse. A second type consists of incoming transaction data that does not correspond to any data that already exists in the data warehouse. This type of data may need to be introduced to the data warehouse for the first time. Thus, depending on the existence of a particular data item in the data warehouse, either an insert or update operation may be performed.

One conventional approach for merging OLTP data into a data warehouse involves executing a sequence of database statements, e.g., DML statements in the form of structured query language ("SQL") commands. The sequence of database statements may be used to perform a conditional insert or update depending on the existence of a data item in the data warehouse. The following is an example of a sequence of two conventional SQL commands that may accomplish this:

```
UPDATE (select total_sales, sale
    from DW, OLTP
    where DW.cust_id = OLTP.cust_id) V
    set DW.total_sales = DW.total_sales + OLTP.sale
INSERT into DW
    select oust_id, sale
    From OLTP
    Where cust_id not in
        (select DW.cust_id
        from DW
        where DW.cust_id = cust_id)
```

In this example, "DW" refers to a table at the data warehouse and "OLTP" refers to an OLTP table. If an entry in the DW table has a value in the "cust_id" field that is identical to that same field in the DW table, then the "sales" value is added to the "total_sales" value for the corresponding field in the DW table. If that cust_id value does not exist in the DW table, then a new entry is added to the DW table with the new cust_id value.

The code above first uses the UPDATE command. This command uses the total_sales value from the DW table and the sale value from the OLTP table. First, the command scans the respective tables to see if the corresponding cust_id value from the DW table and the OLTP table are equal. When the values are equal, the total_sales value in the DW table is set to be the previous total_sales value with the sale value from the OLTP table added to it.

Next, the code sample uses the INSERT command. This command similarly scans the respective tables and uses the cust_id value from the OLTP table to determine if the particular customer identification is already present in the DW table. If the cust_id value is not found in the data warehouse, then the cust_id value from the OLTP is inserted into the data warehouse along with the sale value.

Although this method may be somewhat simple, it also results in significant overhead and performance problems. For example, executing a separate update command and a separate insert command causes an additional scan operation to be required, per table. Moreover, an additional join operation is required, per table. The considerable expense of these additional operations results in very undesirable performance penalties.

Note that the above described problem is not unique to the data warehouse environment, but exists for other database applications in which a set of source data must be merged into a set of destination data. Therefore, what is needed is a method that overcomes these significant problems found in the conventional systems as described above.

SUMMARY OF THE INVENTION

The present invention extends SQL to provide the ability to alternatively update or insert a row into a table. This functionality is accomplished by merging a source table with a destination table in a fashion that determines which rows in the merged table need to be updated in the destination table and which rows in the merged table need to be inserted into the destination table.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE INVENTION

Certain embodiments as disclosed herein provide for an efficient method for conditionally updating or inserting a source row into a destination table. For example, one method as disclosed herein allows for a source table and a destination table to be joined together in a fashion that determines which rows from the source table may update the destination table and which rows from the source table may be inserted into the destination table.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
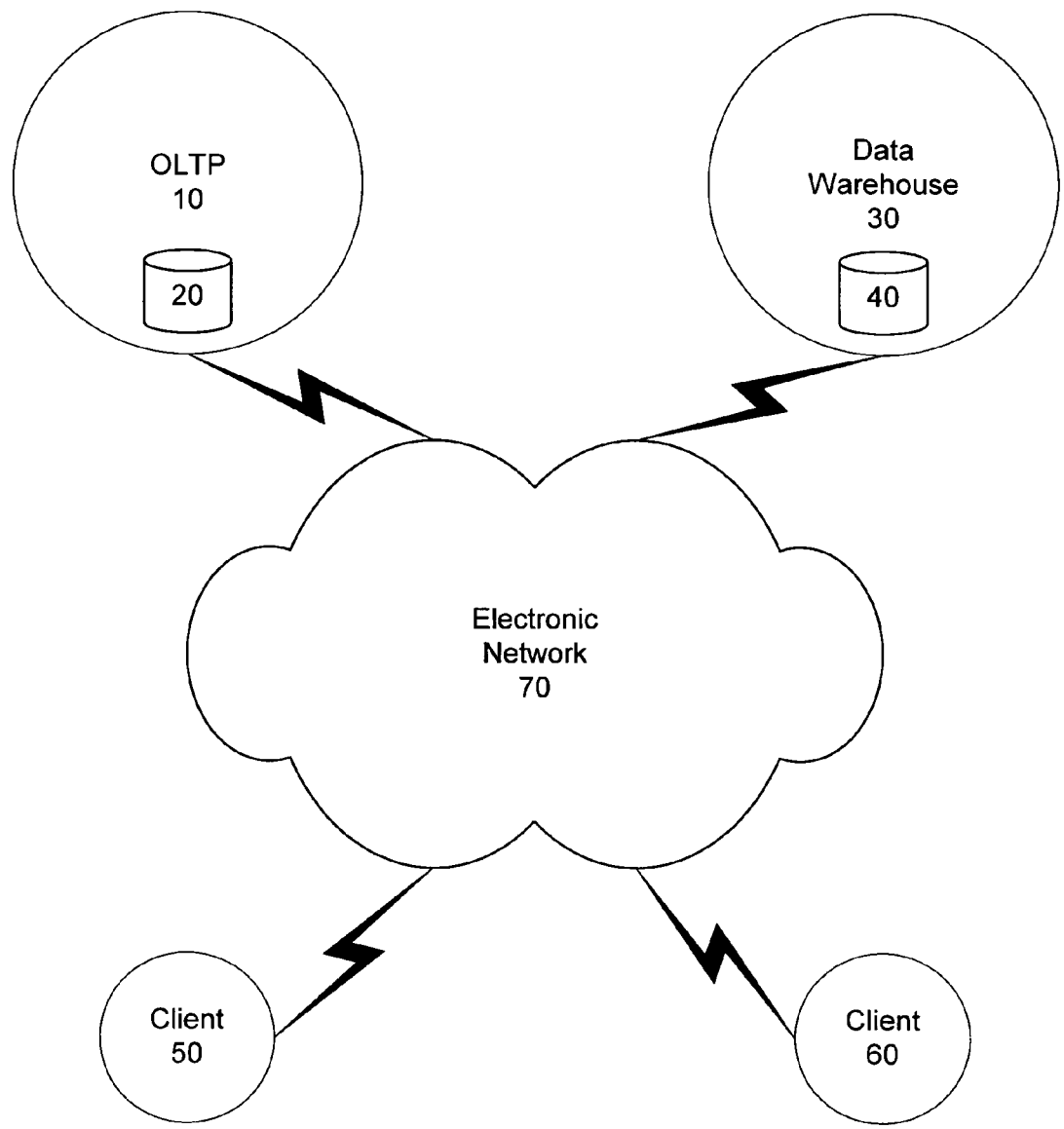
FIG. 1 is a block diagram of an example distributed system in which a row may be conditionally updated or inserted into a table, according to an embodiment of the present invention.

FIG. 1 is a block diagram of an example distributed system in which a row may be conditionally updated or inserted into a table. The distributed system may be comprised of an online transaction processing system ("OLTP") 10 comprising an OLTP database 20. Additionally, the system may include a data warehouse 30 comprising a database 40. The system may also be comprised of several clients, such as client 50 and client 60. Each of the clients may be communicatively coupled with the OLTP 10 through electronic network 70.

The OLTP 10 may be communicatively coupled with the data warehouse 30 over network 70. Additionally, OLTP 10 may be communicatively coupled with the data warehouse 30 through a direct connection (not shown). Network 70 may be a proprietary network, a public network, a wide area network ("WAN"), a local area network ("LAN"), or a combination of networks, such as the well known Internet. Additionally, network 70 may be a wired network or a wireless network.

Database 20 may be comprised of data already existing in database 40. Additionally, database 20 may be comprised of entirely new data that does not exist in database 40. In one embodiment, database 20 may include tabular representations of data that are the same as or similar to the tabular representations of data in database 40. For example, data warehouse 30 may store historical transaction data in database 40. The tabular representation of this data may include a certain database table with particular columns. Advantageously, database 20 may include a table with the same columnar format. This may allow OLTP 10 to populate the table with new data in a manner that allows the most efficient integration of that new data into the existing table in database 20.

Database 40 may be comprised of historical data such as transaction related information. Database 40 may also be comprised of data relating to the particular environment or system it serves. Furthermore, database 40 may be optimized to provide efficient storage and retrieval of data. In addition, database 40 may be configured to allow OLTP 10 to provide updates and retrieve information.

In one embodiment, client 50 may interact with OLTP 10 via network 70. Furthermore, a plurality of additional clients, such as client 60, may interact with the OLTP 10 over the network 70. The interaction between client 50 and OLTP 10 may include a variety of transactions or queries. Transaction data associated with such interaction between client 50 and OLTP 10 may be advantageously stored in database 20 and subsequently provided to data warehouse 30 for inclusion in database 40.

Figure 2:
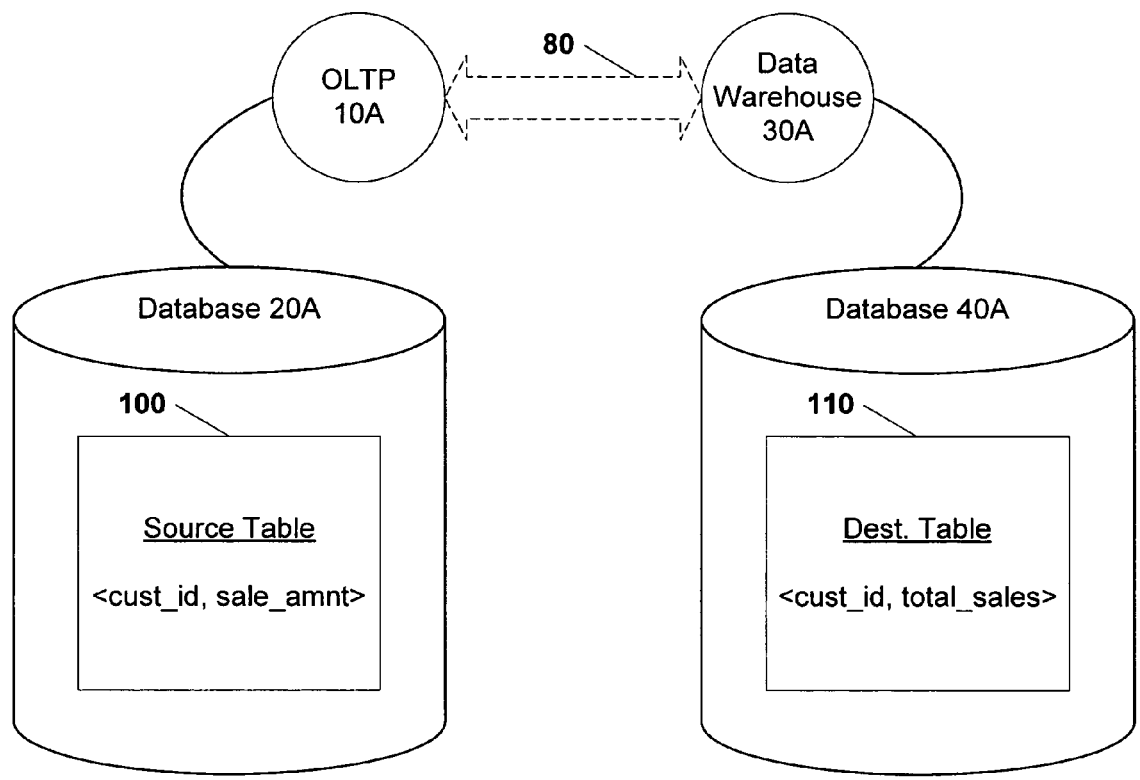
FIG. 2 is a block diagram of an example database system in which a row may be conditionally updated or inserted into a table, according to an embodiment of the present invention.

FIG. 2 is a block diagram of an example database system in which a row may be conditionally updated or inserted into a table. OLTP 10A includes a database 20A that is communicatively connected with data warehouse 30A, having a database 40A. The connection 80 between OLTP 10A and data warehouse 30 may be a direct physical connection or a network based connection, as previously described.

For example, connection 80 between OLTP 10A and data warehouse 30 may be a programmable socket interface or a programmable internal pipe interface. Alternatively, connection 80 may be a serial wire connection or a leased line physical connection over a private network.

The content of database 20A may include a source table 100. Source table 100 may be comprised of various types of information related to the purpose of OLTP 10. The content of database 40A may include a destination table 110. Destination table 110 may be comprised of information related to the purpose of data warehouse 30A in addition to the purpose of OLTP 10.

For example, data warehouse 30A may maintain data related to online purchases of commercial products. Each purchase may be identified as a single transaction in database 40A. Destination table 110 may include a plurality of transaction records, each record comprising a customer identification and a total sale amount for all of the customer's combined purchases. OLTP 10A may process the transaction for each online purchase and store a record of each purchase in database 20A. Each transaction record may be stored in source table 100 and may be comprised of a customer identification and a sale amount for the individual transaction.

Figure 3:
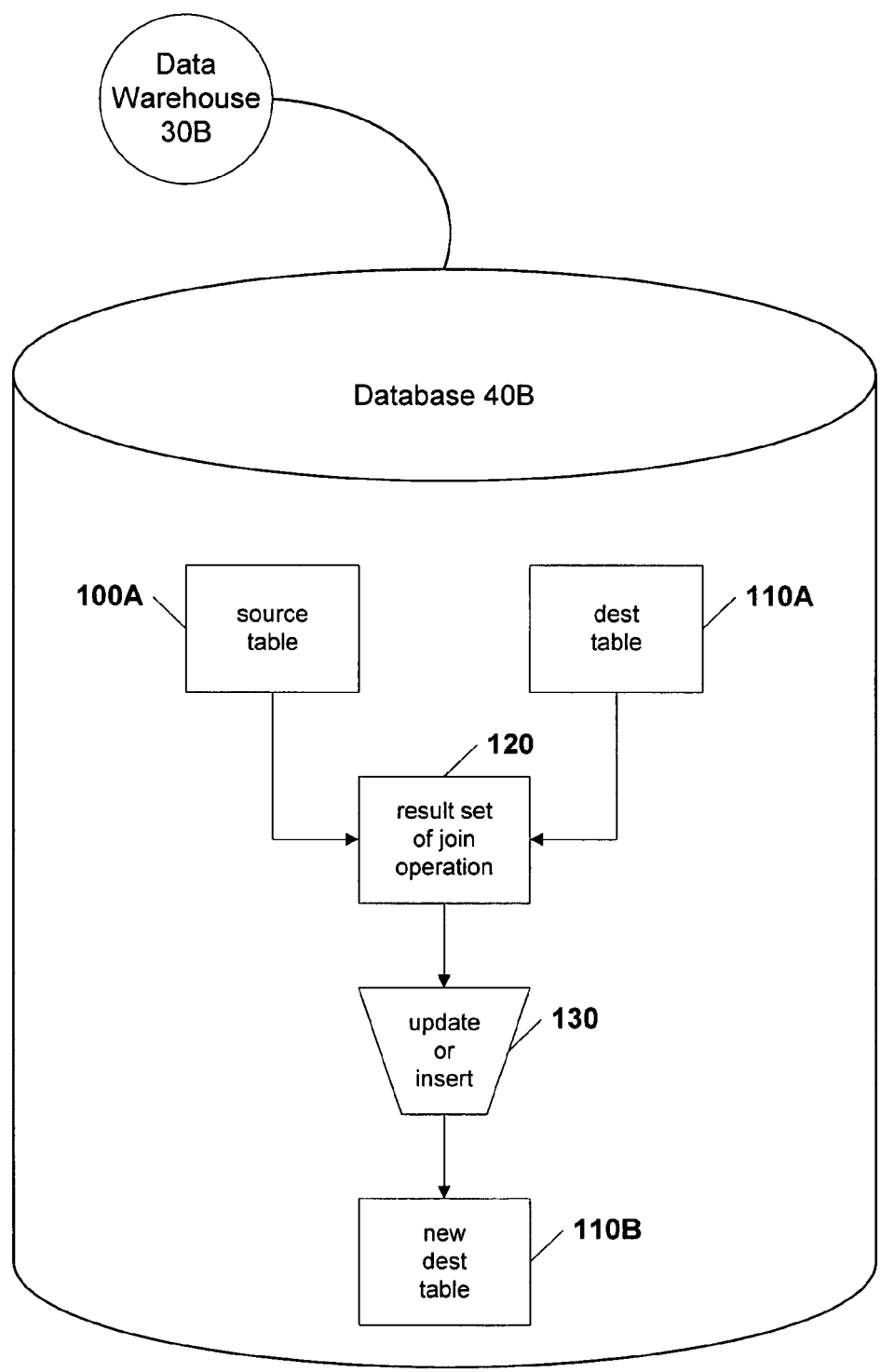
FIG. 3 is a conceptual diagram for conditionally updating or inserting a row into a table, according to an embodiment of the present invention.

FIG. 3 is a conceptual diagram for conditionally updating or inserting a row into a table. In one embodiment, data warehouse 30B may be coupled with database 40B, which may, in turn, contain information related to the purpose of data warehouse 30B. For example, database 40B may contain destination table 110A that stores information as directed by data warehouse 30B. Additionally, database 40B may also contain source table 100A. The source table 100A may have been created in an alternative database system and been subsequently transmitted to data warehouse 30B for storage in database 40B.

Advantageously, source table 100A may be merged with destination table 110A into a result set 120. The result set 120 preferably contains each row from the source table such that no rows from the source table are lost in the join. In one embodiment, the tables may be merged using the outer join SQL command.

For example the two tables to be joined may each have two columns, with the source table having three rows and the destination table having two rows, such as:

TABLE 1

(source)

| Column 1 | Column 2 |
|---|---|
| 3 | 1 |
| 4 | 2 |
| 7 | 3 |

TABLE 2

(destination)

| Column 1 | Column 2 |
|----------|----------|
| 1        | 5        |
| 2        | 6        |

An outer join operation performed on the two tables, designating the source table as the table to be preserved, in which the join column for Table 1 (source table) is Column 2 and the join column for Table 2 (destination table) is Column 1 may produce the following result set, also having two columns and having three rows:

TABLE 3

(result set)

| Column 1 | Column 2 |
|----------|----------|
| 3        | 5        |
| 4        | 6        |
| 7        | NULL     |

In the above example, the first two tables were joined based on the second column of Table 1 and the first column of Table 2. Where the elements of those columns matched, the rows from the two tables were joined. For example, the element [1] exists in column two of the first table and column one of the second table. This match causes the rows to be joined (without including the matching key column element) to result in the first row of Table 3 (result set). Similarly, the second row of Table 3 (result set) is comprised of the rows from Table 1 (source) and Table 2 (destination) with the matching [2] element.

The element [3] from Table 1 (source) is not matched in Table 2 (destination). However, the outer join command may advantageously specify a table to be preserved such that unmatched rows from the table to be preserved are included in the result set of the outer join. Therefore, the result set of the outer join command may advantageously contain each row from Table 1 (source) in order to meet certain data preservation objectives. Thus, the third row in Table 3 (result set) preserves the third row from Table 1 (source) and includes the NULL value as an element. Preferably, this null value may be interpreted to indicate that a corresponding row for row three from Table 1 (source) did not exist in Table 2 (destination).

Once the result set 120 has been created, database 40B may execute function 130 to insert or update each row from result set 120 into destination table 110A. The result of the inserts and updates may create a new destination table 110B.

Figure 4:
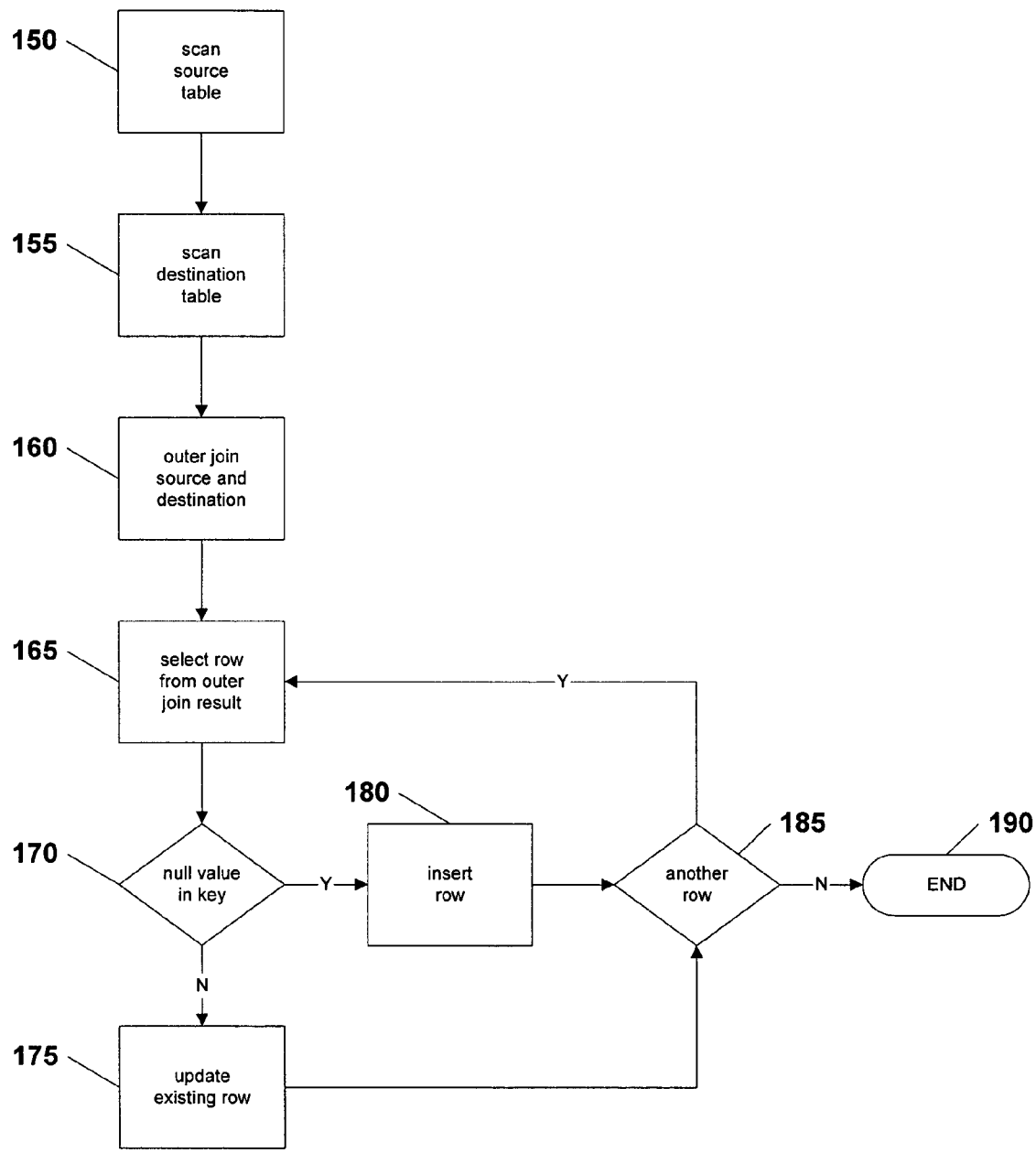
FIG. 4 is a flowchart illustrating an example process for conditionally updating or inserting a row into a table may be implemented, according to an embodiment of the present invention.

FIG. 4 is a flowchart illustrating an example process for conditionally updating or inserting a row into a table may be implemented. Initially, in step 150 the source table may be scanned by the system managing the data warehouse. For example, a computer system may be configured to manage a data warehouse and accept incoming source tables for integration with the appropriate tables in the data warehouse. The incoming source tables may arrive via a network connection or otherwise, for example through a direct connection to the computer system or through a transportable physical medium such as a floppy disk, compact disk, or magnetic tape.

Once the source table has been scanned, the system may additionally scan the destination table, as illustrated in step 155. Once the source table and the destination table have been scanned, an outer join operation may be performed on the two tables. The outer join operation advantageously combines the rows of the two tables such that the result contains the rows that are common to each table and the rows that are unique to each table.

In one embodiment, the result of the outer join operation can be processed row by row, as indicated by step 165 where a row from the result is selected. Once a row has been selected the key value is queried to determine if the value is null, as shown in step 170. A benefit of the outer join operation is that the source table and the destination table can be joined so that if a row in the source table does not exist in the destination table, then a key value may be set to null in the corresponding row of the outer join result. If the key value is not null, then the row may already exist in the destination table and the system may update that row in the destination table, as seen in step 175.

If the key value is null, then the system may insert the row in the destination table, as illustrated in step 180. Once the row from the outer join result has been queried for a null value in the key element and the row has been updated or inserted into the destination table, the system may check for additional rows from the outer join result, as shown in step 185. If additional rows exist, the system may select that row, as indicated by the return to step 165. If there are no additional rows from the outer join result, then the source table may be considered integrated with the destination table and the process may end, as seen in step 190.

Figure 5:
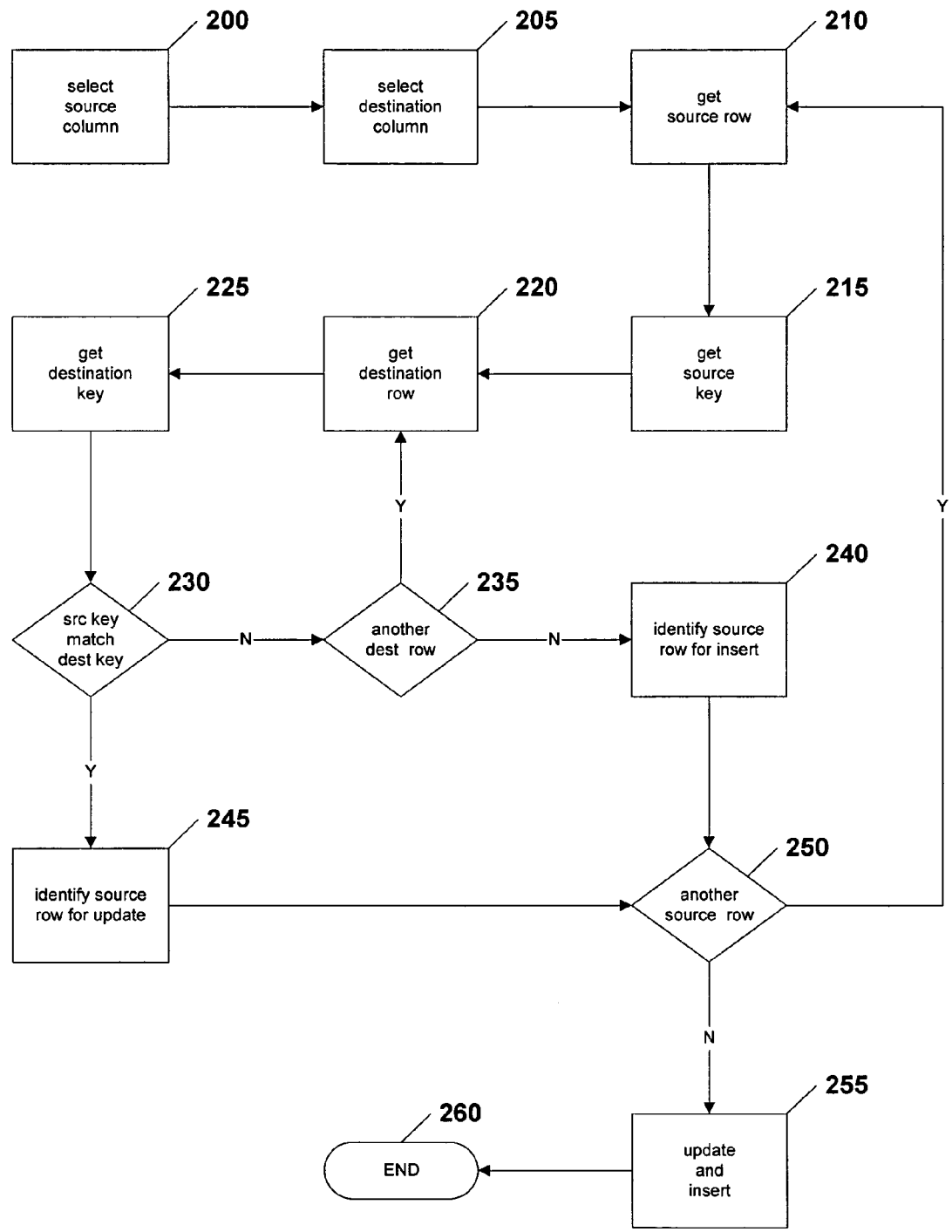
FIG. 5 is a flowchart illustrating an example process for conditionally updating or inserting a row into a table may be implemented, according to an embodiment of the present invention.

FIG. 5 is a flowchart illustrating how an example process for conditionally updating or inserting a row into a table may be implemented. In step 200, a column from the source table may first be selected. Similarly, in step 205 a column from the destination table may be selected. Preferably, these columns selected are similar and contain the same type of data element. For example, although each column may be labeled differently, each column may contain social security numbers. Advantageously, this may allow for accurate comparison of the column elements.

Once a column has been selected from each table, a source row may be obtained, as illustrated in step 210. The source row may be parsed after it has been obtained in order to determine the source key, as shown in step 215. Alternative means for obtaining the source key may also be employed, for example by selecting data from a known location in a database table. In one embodiment, the source key may be the element from the source row that populates the previously selected column.

In a similar fashion, once the source row and source key have been obtained, a destination row and destination key may be obtained, as seen in steps 220 and 225. Once the destination key has been obtained, the source key and the destination key may be compared to determine if there is a match. Alternatively, the source key and the destination key may be compared to determine if they satisfy a different comparison operator such as greater than, less than, not equal to, and the like.

If the source key and destination key do not match or do not satisfy the comparison operation, then the comparison may continue. To determine if additional comparisons may be made, the system may determine if another destination row is available, as illustrated in step 235. If another row is available, then the process may continue by passing control to step 220 in order to obtain the new destination row. If there is not another destination row, then the source row may be identified as a new row and targeted for later insertion into the destination table, as shown in step 240. For example, this may be accomplished by setting the value of a particular element in the row to the null value.

If, however, the source key and the destination key do match, then the source row may be identified as an existing row and targeted for later update into the destination table, as illustrated in step 245. Once the row has been identified as either an update row or an insert row, the system may determine whether any additional rows from the source table exist. If additional rows are available, the process may continue by passing control to step 210 in order to obtain the new source row.

If there are no additional source rows to be processed, then the rows that have previously been identified as an update row or an insert row may be processed, as shown in step 255. This processing may consult a field in each row to determine the row's status for update or insert. Preferably, those rows targeted for insert may be inserted into the destination table and those rows targeted for update may be merged with the existing row having the same key value in the destination table. Once all of the rows have been updated or inserted, the process may end, as seen in step 260.

Figure 6:
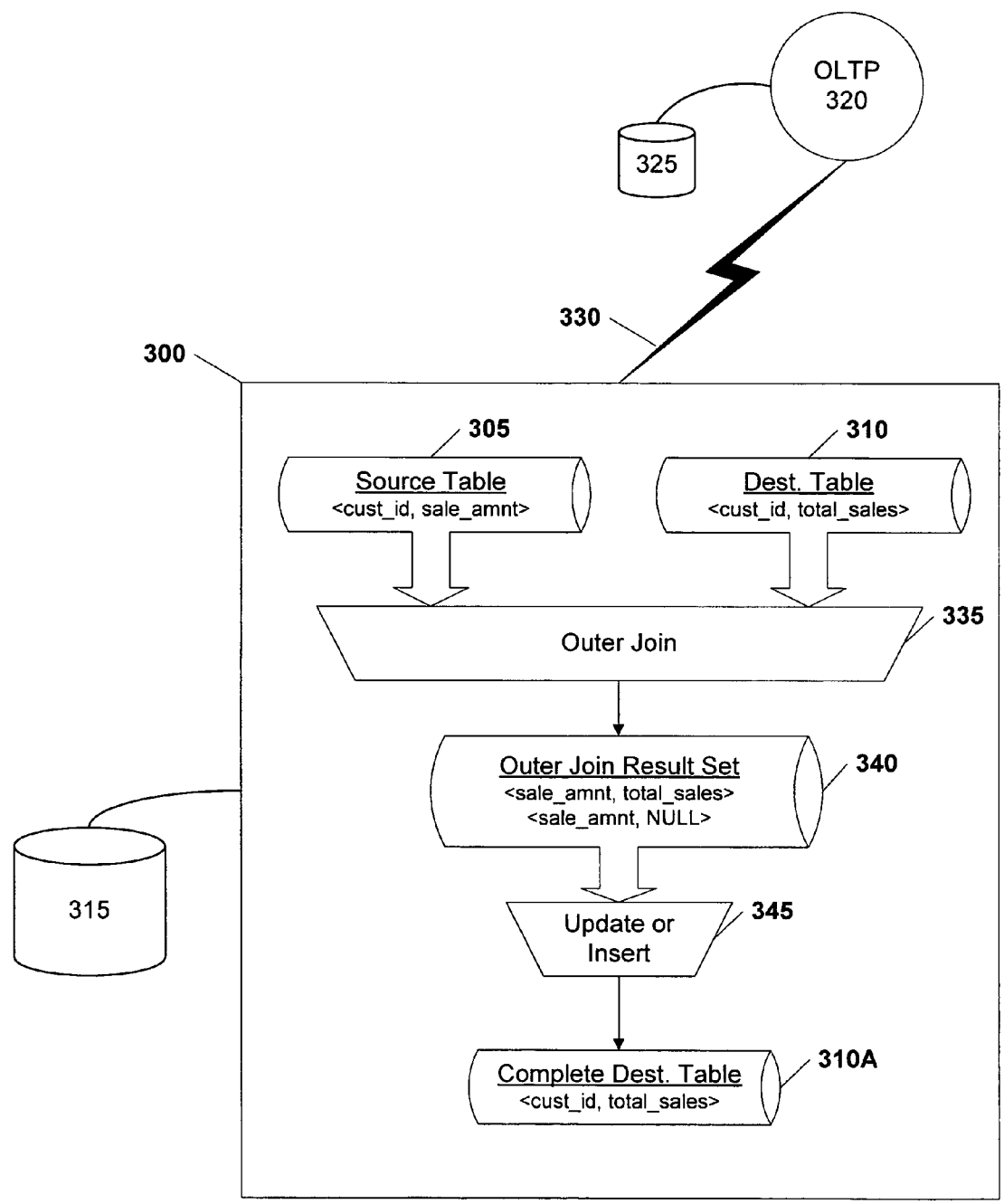
FIG. 6 is a conceptual flow diagram illustrating an example of conditionally updating or inserting a row from a source table into a destination table, according to an embodiment of the present invention.

FIG. 6 is a conceptual flow diagram illustrating an example embodiment of conditionally updating or inserting a row from a source table into a destination table. The process of updating or inserting a row may take place on a data warehouse system 300, operating on a source table 305 and a destination table 310. Destination table 310 is preferably stored in database 315 prior to being processed with source table 305. Additionally, source table 305 may originate from an online transaction processor ("OLTP") system 320, where it may be initially stored in database 325.

Source table 305 may be comprised of records that contain information related to the purchase of goods and/or services via computer network. For example, as goods and services are purchased via computer network, a log of each transaction may be stored in source table 305. In this example embodiment, source table 305 contains a customer identifier (e.g., a social security number or a credit card number) and a sale amount. Preferably, each sale may be represented by a separate record. Therefore, multiple records with the same customer identification may be found in source table 305 if a single customer has made multiple purchases via computer network.

Once source table 305 has been created, it may be sent to data warehouse 300 for more permanent storage. For example, OLTP 320 may send source table 305 to data warehouse 300 via a communications link 330. Preferably, communications link 330 is a computer network. In one embodiment communications link 330 may be the well know Internet. Alternatively, communications link 330 may be a proprietary computer network, private network, virtual private network, wired network, wireless network, or the like.

The data warehouse, after receiving the source table, integrates the data from the source table 305 into the appropriate destination table 310 in database 315. For example, destination table 310 may be comprised of a plurality of rows, each of which may contain a unique customer identification and a total sales amount. Advantageously, records from source table 305 that have the same customer identification number as a record in destination table 310 may have their sale amount value added to the total sales amount value in the destination table 310 record. In this example, embodiment, data warehouse preferably integrates the data from source table 305 into destination table 310 with a single command or a single SQL statement.

Initially, to process the source table 305 and integrate it with destination table 310, the data warehouse 300 may completely join the two tables together, as illustrated in step 335. In this example embodiment, the complete join may be accomplished by performing an outer join step on source table 305 and destination table 310. The result of the outer join step is preferably a result set 340 that includes each row from source table 305. Additionally, those rows from source table 305 that have matching cust_id fields with a row in destination table 310 are preferably joined in result set 340 with that corresponding row from destination table 310.

For example, if a row in source table 305 has the same customer identification number as a row in destination table 310, then the sale amount value from source table 305 is included in result set 340 along with the total sales value from destination table 310. Alternatively, if there is no cust_id match in destination table 310 for the row from source table 305, then the sale amount value from source table 304 is included in result set 340 along with a NULL value.

Additionally, when rows are compiled in result set 340, a key element may be advantageously included in the row. The key element preferably contains a null value when the row originates from source table 305 and does not have a corresponding entry in destination table 310. Alternatively, the key element may preferably contain a non null value when the row in result set 340 has a corresponding row in destination table 310. Result set 340 may be stored on data warehouse 300 in volatile memory or alternatively in database 315. Preferably, result set 340 is stored in volatile memory for more efficient and faster access to its data.

Once result set 340 has been compiled, each row in result set 340 may be processed such that the row is either inserted into destination table 310 or the row provides an update to a corresponding row in destination table 310, as illustrated in step 345. Advantageously, the key element value may be employed to signal the status of the row. For example, a row with a null value in the key element is preferably inserted into destination table 310, while a row with a non null value in the key element is preferably used to update the corresponding row in destination table 310. In this example embodiment, updating a row in destination table 310 may include adding the sale amount value from the row in source table 305 to the total sales amount value in the row in destination table 310.

The result of step 345 advantageously produces a new destination table 310A. Preferably, the rows in the new destination table 310A include each of the rows from destination table 310 and each new row from source table 305. Additionally, new destination table 310A may also preferably have updated rows that add the sale amount data from rows in source table 305 to the total sales amount data from the corresponding rows in destination table 310.

Advantageously, in this example embodiment, new destination table 310A is produced by executing a single database command. Furthermore, the single command may be issued manually by an operator associated with data warehouse 300. Alternatively, the single command may be issued automatically, initiated by the arrival of source table 305 or some other predetermined condition or criteria.

In one embodiment, the command may be called UPSERT, indicating that it conditionally updates and inserts rows from a source table into a destination table. The following is an example syntactic definition of an UPSERT command, according to one embodiment of the invention. It is understood that the example is presented merely to aid in understanding of the broad concepts contemplated by the present invention and therefore is in no way limiting. For example, a typical usage of UPSERT may be:

```
UPSERT Tdest AS D    Destination table
USING Tsrc AS S      Source table
ON (D.dkey = S.skey) Search/join condition
UPDATE               Update if exists in destination table
    SET D.destval = D.destval + S.srcval
ELSE                 Insert if not in destination table
    INSERT (destkey, destval) VALUES (srckey, srcval)
```

Particular advantages may be realized by using an UPSERT command such as the one illustrated above. For example, only a single join operation is performed. Furthermore, only a single scan operation is performed. This considerably minimizes the number of operations necessary to carry out the operation for conditionally updating or inserting a row from a source table into a destination table.

Figure 7:
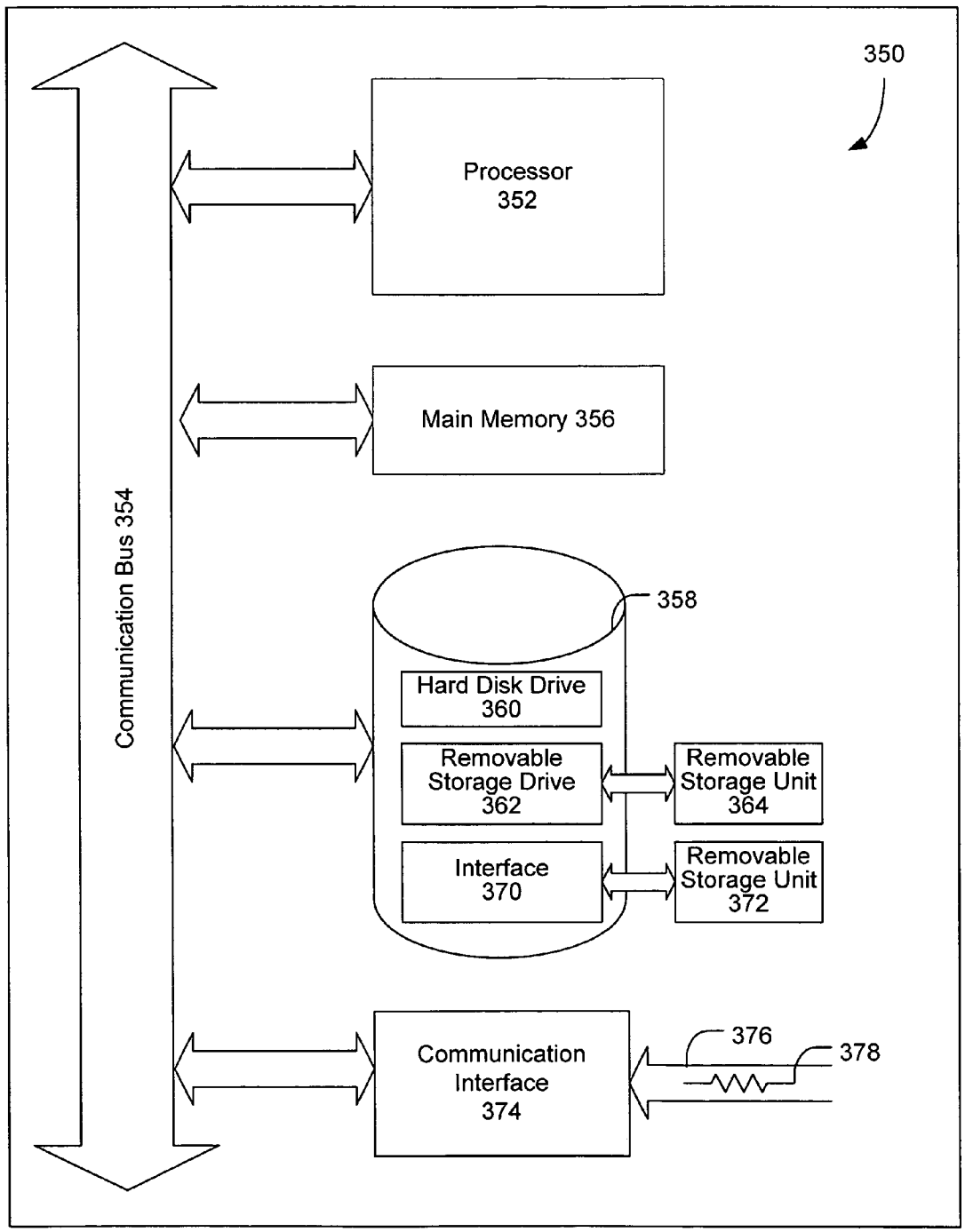
FIG. 7 is a block diagram illustrating an exemplary computer system as may be used in connection with various embodiments described herein.

FIG. 7 is a block diagram illustrating an exemplary computer system 350 which may be used in connection with various embodiments described herein. For example, the computer system 350 may be used in conjunction with a client, an online transaction processor, a data warehouse, or to provide connectivity, data storage, and other features useful for operating an online transaction processor, a data warehouse, or a database management system. However, other computer systems and/or architectures may be used, as will be clear to those skilled in the art.

The computer system 350 preferably includes one or more processors, such as processor 352. Additional processors may be provided, such as an auxiliary processor to manage input/output, an auxiliary processor to perform floating point mathematical operations, a special-purpose microprocessor having an architecture suitable for fast execution of signal processing algorithms ("digital signal processor"), a slave processor subordinate to the main processing system ("back-end processor"), an additional microprocessor or controller for dual or multiple processor systems, or a coprocessor. Such auxiliary processors may be discrete processors or may be integrated with the processor 352.

The processor 352 is preferably connected to a communication bus 354. The communication bus 354 may include a data channel for facilitating information transfer between storage and other peripheral components of the computer system 350. The communication bus 354 further may provide a set of signals used for communication with the processor 352, including a data bus, address bus, and control bus (not shown). The communication bus 354 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

Computer system 350 preferably includes a main memory 356 and may also include a secondary memory 358. The main memory 356 provides storage of instructions and data for programs executing on the processor 352. The main memory 356 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, as well as read only memory (ROM).

The secondary memory 358 may optionally include a hard disk drive 360 and/or a removable storage drive 362, for example a floppy disk drive, a magnetic tape drive, an optical disk drive, etc. The removable storage drive 362 reads from and/or writes to a removable storage unit 364 in a well-known manner. Removable storage unit 364 may be, for example, a floppy disk, magnetic tape, optical disk, etc. which is read by and/or written to by removable storage drive 362. The removable storage unit 364 includes a computer usable storage medium having stored therein computer software and/or data.

In alternative embodiments, secondary memory 358 may include other similar means for allowing computer programs or other instructions to be loaded into the computer system 350. Such means may include, for example, a removable storage unit 372 and an interface 370. Examples of secondary memory 358 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units 372 and interfaces 370, which allow software and data to be transferred from the removable storage unit 372 to the computer system 350.

Computer system 350 may also include a communication interface 374. The communication interface 374 allows software and data to be transferred between computer system 350 and external devices, networks or information sources. Examples of some types of components that might comprise communication interface 374 include a modem, a network interface (such as an Ethernet card), a communications port, a PCMCIA slot and card, and an infrared interface, to name a few. Communication interface 374 preferably implements industry promulgated protocol standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/internet protocol (TCP/IP), serial line Internet protocol/point to point protocol (SLIP/PPP), and so on, but may also implement non-standard interface protocols as well. Software and data transferred via communication interface 374 are generally in the form of signals 378 which may be electronic, electromagnetic, optical or other signals capable of being received by communication interface 374. These signals 378 are provided to communication interface 374 via a channel 376. This channel 376 carries signals 378 and can be implemented using wire or cable, fiber optics, a phone line, a cellular phone link, a radio frequency (RF) link, or other communications channels.

Computer programming instructions (i.e., computer programs or software) are stored in the main memory 356 and/or the secondary memory 358. Computer programs can also be received via communication interface 374. Such computer programs, when executed, enable the computer system 350 to perform the features relating to the present invention as discussed herein.

In this document, the term "computer program product" is used to refer to any media used to provide programming instructions to the computer system 350. Examples of these media include removable storage units 364 and 372, a hard disk installed in hard disk drive 360, and signals 378. These computer program products are means for providing programming instructions to the computer system 350.

In an embodiment that is implemented using software, the software may be stored in a computer program product and loaded into computer system 350 using hard drive 360, removable storage drive 362, interface 370 or communication interface 374. The software, when executed by the processor 352, may cause the processor 352 to perform the features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will be apparent those skilled in the relevant art. Various embodiments may also be implemented using a combination of both hardware and software.

While the particular method for conditionally updating or inserting a row into a table herein shown and described in detail is fully capable of attaining the above described objects of this invention, it is to be understood that the description and drawings represent the presently preferred embodiment of the invention and are, as such, a representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

What is claimed is:

1. A computer-implemented method for applying a row from a source table to a destination table, the method comprising:
    selecting a first column from a source table;
    selecting a second column from a destination table;
    performing an outer join operation on the source table and the destination table using the first and second columns, the outer join designating the source table as being preserved;
    updating each row in the destination table with a row from the results of the outer join operation containing a matching element in the first and second columns; and
    inserting into the destination table each row from the results of the outer join operation with a non-matching element in the first and second columns,
    the method performing no more than one scan per table.

2. The method of claim 1 further comprising;
    combining the rows in the source table such that the first column has a unique element in each row.

3. The method of claim 2 wherein combining the rows in the source table comprises:
    sorting the rows in the source table based on the element in the first column;
    creating a group of rows, wherein each row in the group of rows contains a matching element in the first column; and
    combining the group of rows into a single row.

4. The method of claim 1 wherein the outer join operation uses an equal comparison operator for a comparison statement.

5. A statement implementing a computer-implemented process for inserting a new row or updating an existing row in a database table, the process comprising the steps of:
    selecting from a source table a first column comprising a plurality of elements;
    selecting from a destination table a second column comprising a plurality of elements;
    determining a set of matching rows based upon the success of a comparison operation on an element in the first column and an element in the second column;
    determining a set of non-matching rows based upon the failure of a comparison operation on the first column element and the second column element;
    updating the destination table with the set of matching rows; and
    inserting into the destination table the set of non-matching rows,
    the statement performing no more than one scan per table.

6. The process of claim 5 further comprising:
    combining the rows in the source table, wherein the resulting source table has a unique element in each row of the first column.

7. The process of claim 6 wherein combining the rows in the source table comprises:
    sorting the rows in the source table based on the element in the first column;
    creating a group of rows, wherein each row in the group of rows contains a matching element in the first column; and
    combining the group of rows into a single row.

8. The process of claim 5 wherein the comparison operation uses an equal comparison operator.

9. A computer-implemented method for upserting a source table with a destination table, the method comprising:
    selecting from a source table a first column comprising a plurality of elements;
    selecting from a destination table a second column comprising a plurality of elements;
    updating a row in the destination table with a row from the source table upon the success of a comparison operation on an element in the first column of the row from the source table and an element in the second column of the row from the destination table; and
    inserting a row from the source table into the destination table upon the failure of a comparison operation on an element in the first column of the row from the source table and an element in the second column of the row from the destination table,
    the method using no more than one query language statement.

10. The method of claim 9 further comprising:
    combining the rows in the source table, wherein the resulting source table has a unique element in each row of the first column.

11. The method of claim 10 wherein combining the rows in the source table comprises:
    sorting the rows in the source table based on the element in the first column;
    creating a group of rows, wherein each row in the group of rows contains a matching element in the first column; and
    combining the group of rows into a single row.

12. The method of claim 9 wherein the comparison operation uses an equal comparison operator.

13. A computer implemented method for aggregating data in a database, comprising:
    parsing from a single command line, a command, a source table, a destination table, a source key, and a destination key;
    comparing the source key in each row of the source table with the destination key in each row of the destination table;

determining a set of update rows based upon the success of a comparison operation performed on the source key and the destination key;

determining a set of insert rows based upon the failure of a comparison operation performed on the source key and the destination key;

updating the destination table with the set of update rows; and inserting into the destination table the set of insert rows;

wherein no more than one command line is parsed.

14. The method of claim 13 further comprising:

combining the rows in the source table, wherein the resulting source table has a unique source key in each row of the source table.

15. The method of claim 14 wherein combining the rows in the source table comprises:

sorting the rows in the source table based on the source key;

creating a group of rows, wherein each row in the group of rows contains a matching element in the source key; and combining the group of rows into a single row.

16. The method of claim 13 wherein the comparison operation uses an equal comparison operator.

17. A computer program product including a medium usable by a processor, the medium having stored thereon a sequence of instructions, wherein when the sequence of instructions is executed by the processor, the processor executes a process for applying a row from a source table to a destination table, the process comprising:

selecting a first column from a source table;

selecting a second column from a destination table;

performing an outer join operation on the source table and the destination table using the first and second columns, the outer join designating the source table as being preserved;

updating each row in the destination table with a row from the results of the outer join operation containing a matching element in the first and second columns; and inserting into the destination table each row from the results of the outer join operation with a non-matching element in the first and second columns;

the process performing no more than one scan per table.

18. The computer program product of claim 17 wherein the process further comprises combining the rows in the source table such that the first column has a unique element in each row.

19. The computer program product of claim 18 wherein combining the rows in the source table comprises:

sorting the rows in the source table based on the element in the first column;

creating a group of rows, wherein each row in the group of rows contains a matching element in the first column; and combining the group of rows into a single row.

20. The computer program product of claim 17 wherein the outer join operation uses an equal comparison operator for a comparison statement.

21. A computer program product including a medium usable by a processor, the medium having stored thereon a sequence of instructions, wherein when the sequence of instructions is executed by the processor, the processor executes a process for inserting a new row or updating an existing row in a database table using no more then one query language statement, the process comprising:

selecting from a source table a first column comprising a plurality of elements;

selecting from a destination table a second column comprising a plurality of elements;

determining a set of matching rows based upon the success of a comparison operation on an element in the first column and an element in the second column;

determining a set of non-matching rows based upon the failure of a comparison operation on the first column element and the second column element;

updating the destination table with the set of matching rows; and inserting into the destination table the set of non-matching rows, the no more than one query language statement performing no more than one scan per table.

22. The computer program product of claim 21 wherein the process further comprises combining the rows in the source table, wherein the resulting source table has a unique element in each row of the first column.

23. The computer program product of claim 22 wherein combining the rows in the source table comprises:

sorting the rows in the source table based on the element in the first column;

creating a group of rows, wherein each row in the group of rows contains a matching element in the first column; and combining the group of rows into a single row.

24. The computer program product of claim 21 wherein the comparison operation uses an equal comparison operator.

25. A computer program product including a medium usable by a processor, the medium having stored thereon a sequence of instructions, wherein when the sequence of instructions is executed by the processor, the processor executes a process for upserting a source table with a destination table, the process comprising:

selecting from a source table a first column comprising a plurality of elements;

selecting from a destination table a second column comprising a plurality of elements;

updating a row in the destination table with a row from the source table upon the success of a comparison operation on an element in the first column of the row from the source table and an element in the second column of the row from the destination table; and inserting a row from the source table into the destination table upon the failure of a comparison operation on an element in the first column of the row from the source table and an element in the second column of the row from the destination table, the process using no more than one query language statement.

26. The computer program product of claim 25 wherein the process further comprises combining the rows in the source table, wherein the resulting source table has a unique element in each row of the first column.

27. The computer program product of claim 26 wherein combining the rows in the source table comprises:

sorting the rows in the source table based on the element in the first column;

creating a group of rows, wherein each row in the group of rows contains a matching element in the first column; and combining the group of rows into a single row.

28. The computer program product of claim 25 wherein the comparison operation uses an equal comparison operator.

29. A computer program product including a medium usable by a processor, the medium having stored thereon a sequence of instructions, wherein when the sequence of instructions is executed by the processor, the processor executes a process for aggregating data in a database, the process comprising:

parsing from a single command line, a command, a source table, a destination table, a source key, and a destination key;

comparing the source key in each row of the source table with the destination key in each row of the destination table;

determining a set of update rows based upon the success of a comparison operation performed on the source key and the destination key;

determining a set of insert rows based upon the failure of a comparison operation performed on the source key and the destination key;

updating the destination table with the set of update rows; and inserting into the destination table the set of insert rows;

wherein no more than one command line is parsed.

30. The computer program product of claim 29 wherein the process further comprises combining the rows in the source table, wherein the resulting source table has a unique source key in each row of the source table.

31. The computer program product of claim 30 wherein combining the rows in the source table comprises:

sorting the rows in the source table based on the source key;

creating a group of rows, wherein each row in the group of rows contains a matching element in the source key; and combining the group of rows into a single row.

32. The computer program product of claim 29 wherein the comparison operation uses an equal comparison operator.

33. A computer-implemented system for upserting a source table with a destination table, the system comprising:

logic for selecting from a source table a first column comprising a plurality of elements;

logic for selecting from a destination table a second column comprising a plurality of elements;

logic for updating a row in the destination table with a row from the source table upon the success of a comparison operation on an element in the first column of the row from the source table and an element in the second column of the row from the destination table; and logic for inserting a row from the source table into the destination table upon the failure of a comparison operation on an element in the first column of the row from the source table and an element in the second column of the row from the destination table, the system using no more than one query language statement.

34. The system of claim 33 further comprising:

logic for combining the rows in the source table, wherein the resulting source table has a unique element in each row of the first column.

35. The system of claim 34 wherein the logic for combining the rows in the source table comprises:

logic for sorting the rows in the source table based on the element in the first column;

logic for creating a group of rows, wherein each row in the group of rows contains a matching element in the first column; and combining the group of rows into a single row.

36. The system of claim 33 wherein the comparison operation uses an equal comparison operator.

* * * * *